United States Patent Office
3,360,524
Patented Dec. 26, 1967

3,360,524
WATER-SOLUBLE DYESTUFFS CONTAINING HALOGENATED CYCLOBUTENE OR CYCLOBUTANE CARBOXAMIDE GROUPS
Otto Scherer, Bad Soden, Taunus, and Klaus Uhl, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Feb. 26, 1965, Ser. No. 435,670
Claims priority, application Germany, Feb. 28, 1964, F 42,148
7 Claims. (Cl. 260—277)

ABSTRACT OF THE DISCLOSURE

Water-soluble fiber-reactive dyestuffs containing, as reactive groupings, at least one of the moieties

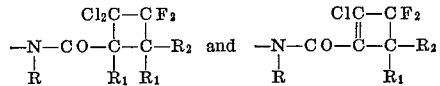

in which $R_1$ is hydrogen, chlorine or lower alkyl, $R_2$ is hydrogen or lower alkyl and R is hydrogen or methyl, said dyestuffs being suitable for the dyeing or printing of cellulosic or protein-containing fibrous materials.

The present invention provides water-soluble dyestuffs and a process for preparing them; more particularly, it provides water-soluble dyestuffs of one of the general Formulae 1 and 2

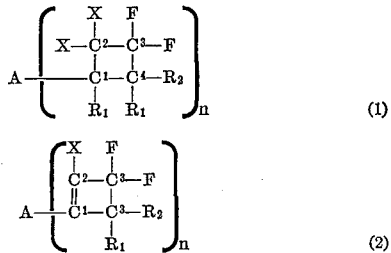

in which A represents the radical of any organic dyestuff molecule, $R_1$ and $R_2$ each represent a hydrogen or a chlorine atom or a carboxylic acid, cyano, nitro or sulfonic acid group or a group —R′, —OR′, —COOR‴, —SO$_2$—NR′NR″, —SO$_2$—R′ or —CO—NR′—R″, and the two substituents $R_1$ may represent together a further carbon linkage between carbon atoms $C^1$ and $C^4$, —R′ and R″ each stand for a hydrogen atom or an alkyl or aryl group, R‴ for an alkyl or aryl group, X represents a hydrogen or halogen atom, advantageously a fluorine or chlorine atom, and n is an integer from 1 to 5.

We have found that valuable water-soluble dyestuffs of the above Formulae 1 and 2, respectively, can be obtained by reacting 1 mol of a dyestuff of the general formula A—$Z_m$ in which A is defined as above, m is an integer from 1 to 5 and Z represents
(a) an amino group or
(b) a reactive halogen atom at the aromatic system of the dyestuff molecule, which halogen atom is linked directly or via a carbonyl or sulfonyl group to the aromatic system, with 1 to 5 mols of a compound of one of the general Formulae 3 and 4

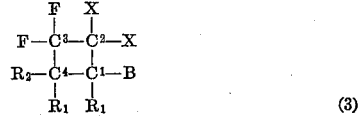

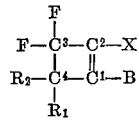

in which $R_1$, $R_2$ and X have the meanings given above and B represents one of the groupings —CO-halogen, —SO$_2$-halogen, —CH$_2$—CH$_2$—SO$_2$-halogen, —CH=CH—CO-halogen and —CHR′—CHR″—CO-halogen, if Z is an amino group, or an alkylene-NH$_2$-group, if Z is a halogen atom, at a temperature between about 0° C. and about 80° C., advantageously between about 10° C. and about 30° C., in an aqueous, aqueous-organic or exclusively organic medium at a pH-value between about 6.5 and about 10 in the presence of an acid-binding agent.

As dyestuffs A there may be used, for example, monoazo, disazo and trisazo dyestuffs, dyestuffs of the triphenylmethane, anthraquinone, phthalocyanine, nitro, acridone, oxazine, dioxazine, indigoid or thioindigoid series, derivatives of perylenetetracarboxylic acid and thiazole and acridine dyestuffs.

As reaction components of the above Formulae 3 and 4 respectively, the following compounds may be used, for example 2,2 - dichloro - 3,3 - difluorocyclobutanecarboxylic acid chloride-1, 3-(2′,2′-dichloro-3′-difluorocyclobutyl)-acrylic acid chloride, 3-(2′,2′-dichloro-3′,3′-difluoro-4′-methylcyclobutyl)-acrylic acid chloride, 2-chloro - 3,3 - difluorocyclobutene - 1 - carboxylic acid chloride-1, 1,2,2 - trichloro - 2,2 - difluorocyclobutanecarboxylic acid chloride-1.

The compounds of Formulae 3 and 4, respectively, to be reacted in accordance with the invention may be obtained by reaction of unsaturated nitriles under pressure at elevated temperatures with halogenated olefins, subsequent saponification to halogenated cyclobutanecarboxylic acids and further reaction yielding carboxylic acid halides. The said cylcobutanecarboxylic acid halides may also be obtained by reacting unsaturated carboxylic acids with halogenated olefins under the above conditions, converting the halogenated cyclobutanecarboxylic acids so obtained to the corresponding acid halide by known processes, or by direct synthesis of the halides of unsaturated carboxylic acids with halogenated olefins (cf. U.S. Patents Nos. 2,441,128 and 2,462,345).

The above mentioned compounds to be reacted in accordance with the invention can also be obtained by converting the abovementioned nitriles into amines in known manner.

When the reaction is carried out in an aqueous or aqueous-organic medium, it is advantageous to use hydroxides, carbonates or hydrogen carbonates of the metals of the first to third group of the Periodic System as acid binding agents, advantageously the sodium compounds. When the reaction is carried out in an organic medium, tertiary organic bases such as, for example, dimethylaniline, pyridine or picoline are preferably used as acid binding agents.

The reaction according to the present invention may also be carried out at a temperature above or below the temperature range indicated above; however, if the reaction is carried out at lower temperatures, the reaction times are correspondingly longer and if the reaction is carried out at higher temperatures, the yields are smaller. The optimum temperature to be used in each individual case depends on the reaction components used.

The dystuffs obtainable by the process of the invention give dyeings and prints of very good fastness properties on fibrous materials of native or regenerated cellulose such as, for example, cotton, linen, hemp, staple fibers or rayon, or of native or regenerated protein fibers such as, for example, wool or silk.

Dyeings are advantageously obtained by impregnating the fibrous material with the dyestuffs in the presence of agents having an alkaline reaction or by dyeing it in a long liquor. If the dyestuff has no or no pronounced affinity for the fibrous material, it is advantageous to impregnate the fibrous material in the cold or at moderate temperature with an aqueous solution of the dyestuff, which solution may contain a salt, and then to squeeze off. The dyestuff solutions may contain inorganic salts such as, for example, alkali metal chlorides or alkali metal sulfates. As agents having an alkaline reaction there are advantageously used inorganic compounds such as, for example, alkali or alkaline earth metal hydroxides, alkali metal bicarbonates, alkali metal carbonates, alkali metal phosphates such as trisodium phosphate or mixtures of disodium phosphate and trisodium phosphate, alkali metal borates or alkali metal salts of trichloracetic acid, or mixtures of such agents having an alkaline reaction.

The dyestuffs so applied to the fibrous material are thermo-set after impregnation. The impregnated material is subjected to a heat treatment, if desired after intermediate drying. The heat treatment is carried out by steaming, in a heated current of air or in an organic solvent. If, for example, alkali metal hydroxides are used, setting may already be carried out in the cold or at moderately elevated temperature by abandoning the impregnated material for several hours.

When impregnating baths free from agents having an alkaline reaction are used, the impregnated material is advantageously introduced into a salt-containing alkali bath and subsequently subjected to a heat treatment. By using an appropriate combination of temperature and pH-value and choosing an appropriate alkali, the dyestuffs may also be thermo-set during dyeing.

It is also possible to apply the dyestuffs of the invention to the fibrous material by textile printing. To make the printing colours, the dyestuffs are dissolved in water, if desired with addition of conventional auxiliary agents, for example, hygroscopic substances or solution promoters such as urea, acetamide or dimethyl sulfoxide, and while adding dispersants, and stirred with thickening agents such as methyl cellulose, starch ether, alginate thickeners or emulsion thickeners (oil-in-water or water-in-oil types with or without addition of further thickeners). The pastes so obtained are then mixed with the above alkalies and the material is printed in usual manner. Thermo-setting is then brought about by a heat treatment with steam carried out, for example, for 5 to 10 minutes at 101° to 105° C. or for about 30 seconds to 1 minute at 145° to 150° C., or by treating with dry heat for several minutes at, for example, 120° to 150° C. or for about 30 seconds to 1 minute at 190 to 220° C.

The above mentioned temperatures and thermosetting times may be modified depending on the nature and quantity of the alkali used.

The fibrous material may also be printed with substantially neutral or even weakly acid printing pastes free from agent having an alkaline reaction. In this case, the fibrous material must be treated, before or after printing, with an agent having an alkaline reaction. The dyestuff is thermo-set by treating with steam or applying heat, the period of time for which it is treated and the temperature depending on the nature and quantity of the alkali.

It is also possible to thermo-set the dyestuff by a short passage through a hot salt-containing alkaline solution without steaming.

The following examples serve to illustrate the invention but they are not intended to limit it thereto, the parts being by weight unless otherwise stated and the relationship of parts by volume being the same as that of the kilogram to the liter:

Example 1

45.3 parts of the aminoazo compound obtained by coupling diazotized 4-acetylamino-1-aminobenzene-2-sulfonic acid with 1-(4'-sulfophenyl)-3-methyl-5-pyrazolone and hydrolytically splitting off the acetyl group in aqueous solution with sodium hydroxide solution, were adjusted to pH 8 with 2 N-sodium carbonate solution. 22.3 parts of 2,2 - dichloro-3,3-difluorocyclobutanecarboxylic acid chloride-1 dissolved in 50 parts by volume of acetone in one instance and 50 parts by volume of dioxane in another instance, and simultaneously a 2 N-sodium carbonate solution were then added dropwise in a manner such that the solution was maintained at a pH of 7.5 to 8. The whole was then acidified with acetic acid, a saturated sodium chloride solution was added and the dyestuff of the formula

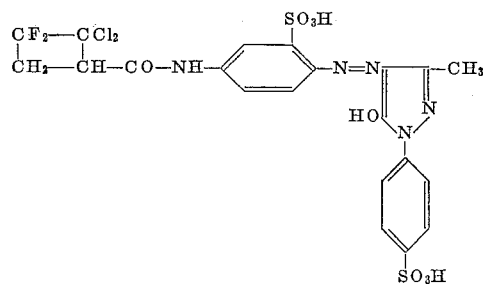

precipitated and was filtered.

When applied to cotton in an alkaline bath, the dyestuff gave reddish yellow dyeings that had very good wet fastness properties.

A cotton fabric was printed using sodium bicarbonate as the alkali and after thermo-setting in a continuously operating steamer and processing according to the customary methods for reactive dyestuffs, a reddish yellow print of very good properties of wet fastness was obtained.

Example 2

44.8 parts of the aminoazo compound obtained by coupling diazotized 1-acetylamino-3-aminobenzene-4-sulfonic acid with 1-(3'-sulfophenyl)-5-pyrazolone-3-carboxylic acid and hydrolytically splitting off the acetyl group in aqueous solution with sodium hydroxide solution, were reacted with 18.6 parts of 2-chloro-3,3-difluorocyclobutene-1-carboxylic acid chloride -1 under the conditions described in Example 1.

The dyestuff of the formula

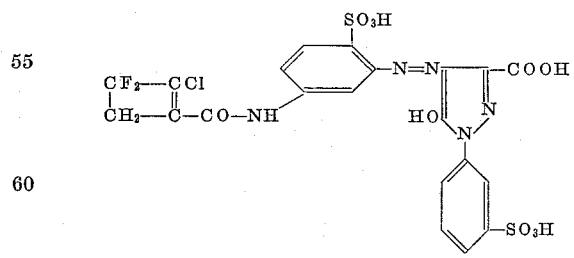

was obtained.

When applied from an alkaline bath, the dyestuff gave a greenish yellow dyeing on cotton that had good properties of wet fastness.

By using the sodium salt of trichloracetic acid as the alkali and thermo-setting for 20 minutes in a Stern steamer, a greenish yellow print of good properties of wet fastness was obtained on cotton.

Example 3

45.3 parts of the aminoazo compound obtained by coupling diazotized 1-aminobenzene-2,5-disulfonic acid with 1-(3'-aminophenyl)-3-methyl-5-pyrazolone, were acylated with 25.7 parts of 1,2,2-trichloro-3,3-difluorocyclobutanecarboxylic acid chloride -1 under the conditions described in Example 1. The dyestuff of the formula

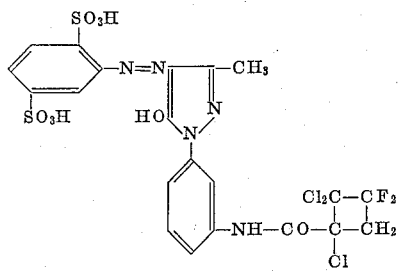

was obtained which when applied to cotton in an alkaline bath gave reddish yellow dyeings of very good properties of wet fastness.

When viscose rayon was printed with a printing paste containing, in addition to the dyestuff, urea and sodium bicarbonate as the alkali and the dyestuff was thermo-set in a continuously operating steamer (type Mather-Platt), a reddish yellow print that had a good fastness to washing was obtained.

Example 4

22.3 parts of 2,2-dichloro-3,3-difluorocyclobutanecarboxylic acid chloride-1 were reacted under the conditions described in Example 1 with 40.7 parts of the aminoazo compound obtained by coupling diazotized 2-aminonaphthalene-4,8-disulfonic acid with aniline in an acid medium.

The dyestuff of the formula

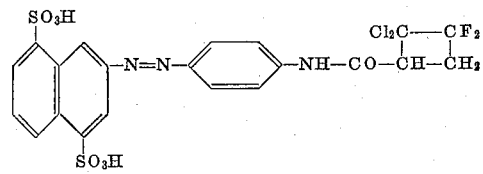

was obtained which when applied to cotton in an alkaline bath gave a reddish yellow dyeing of good properties of wet fastness.

After printing cotton with a neutral printing paste containing the dyestuff, the printed fabric was passed at room temperature through an alkaline, salt-containing padding liquor containing sodium hydroxide solution, sodium carbonate and potassium carbonate and sodium chloride, and the dyestuff was thermo-set by a short passage through a two-phase steamer, a reddish yellow print of very good properties of wet fastness being obtained.

Example 5

By acylating 42.3 parts of the aminoazo compound obtained by coupling diazotized 1-aminobenzene-2-sulfonic acid with 2-amino-5-hydroxynaphthalene-7-sulfonic acid, with 18.6 parts of 2-chloro-3,3-difluorocyclobutene-1-carboxylic acid chloride-1 in the manner described in Example 1, the dyestuff of the formula.

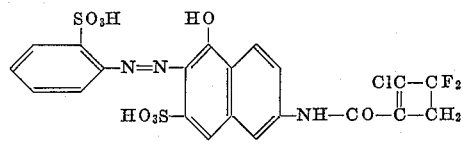

was obtained which when applied to cotton in an alkaline bath gave orange red shades of good properties of wet fastness.

When cotton fabric was printed with a neutral printing paste containing the dyestuff and the printed fabric was passed through an alkaline, salt-containing padding liquor and the dyestuff was thermo-set in a two-phase steamer, an orange-colored print of very good properties of wet fastness was obtained.

Example 6

47.2 parts of the aminoazo compound obtained by coupling diazotized 4-chloro-1-aminobenzene-2-sulfonic acid with 2-(N-methylamino)-8-hydroxynaphthalene-6-sulfonic acid, were reacted with 25.7 parts of 1,2,2-trichloro-3,3-difluorocyclobutanecarboxylic acid chloride-1 under the conditions described in Example 1.

The dyestuff of the formula

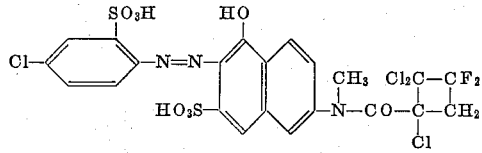

was obtained which when applied to fibrous material of regenerated cellulose in an alkaline bath gave a red dyeing of very good properties of wet fastness.

When the dyestuff was printed on cotton fabric in the presence of sodium carbonate, thermo-set and treated in usual manner, a red print of good fastness to washing was obtained.

Example 7

42.2 parts of the product obtained by coupling diazotized aniline with 1-amino-8-hydroxynaphthalene-3,6-disulfonic acid, were acylated with 25.7 parts of 1,2,2-trichloro-3,3-difluorocyclobutanecarboxylic acid chloride-1 under the conditions described in Example 1. The dyestuff of the formula

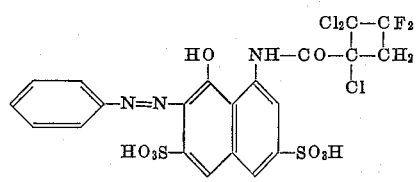

was obtained which when applied to staple fibers in an alkaline bath gave a red dyeing of very good properties of wet fastness.

When a cotton fabric was printed with a neutral printing paste containing the dyestuff, and the dyestuff was thermo-set by a short passage of the printed fabric through a hot, alkaline, salt-containing bath, a red print of very good properties of wet fastness was obtained.

Example 8

60 parts of the aminoazo compound obtained by coupling diazotized 4-nitro-1-aminobenzene-2-sulfonic acid with 1-acetylamino-8-hydroxynaphthalene-3,6-disulfonic acid and reducing the nitro group with sodium sulfide to the amino group, were acylated with 18.6 parts of 2-chloro-3,3-difluorocyclobutene carboxylic acid chloride-1 under the conditions described in Example 1. The dyestuff of the formula

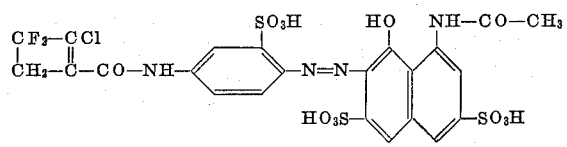

was obtained which when applied to cotton from an alkaline bath gave a bluish red dyeing of very good properties of wet fastness.

Example 9

47.5 parts of the disazo dyestuff obtained by coupling diazotized 4 - amino-1,1'-azobenzene-3,4'-disulfonic acid with 3-methyl-1-aminobenzene, were reacted with 22.3 parts of 2,2 - dichloro - 3,3-difluorocyclobutanecarboxylic acid chloride-1 under the conditions described in Example 1. The dyestuff of the formula

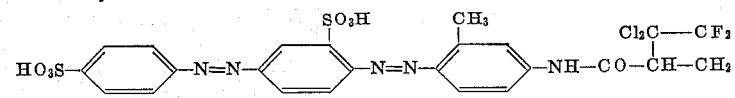

was obtained which when applied to cotton in an alkaline bath gave a yellow-brown dyeing of very good properties of wet fastness.

By using sodium bicarbonate as the alkali in the printing paste, printing a staple fiber fabric and thermo-setting the dyestuff, a yellow-brown print of good properties of wet fastness was obtained.

Example 10

56.9 parts of 1 - amino - 4 - (aminophenyl-4'-amino)-anthraquinone-2,3',5-trisulfonic acid obtained by condensation of 1-amino-4-bromo-anthraquinone-2,5-disulfonic acid with 1,4-diaminobenzene-3-sulfonic acid in an aqueous-alkaline medium, were adjusted to pH 8 with a 2 N-sodium carbonate solution. To this batch 22.3 parts of 2,2-dichloro-3,3-difluorocyclobutane-carboxylic acid chloride-1 and 2 N-sodium carbonate solution were added dropwise in a manner such that a pH range of 7.5 to 8 was maintained. The pH was then adjusted to 2 with concentrated hydrochloric acid and the dyestuff of the formula

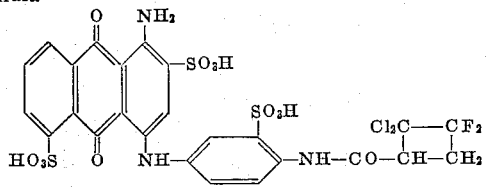

was precipitated by adding sodium chloride. The dyestuff, when applied to cotton in an alkaline bath, gave a greenish blue dyeing of excellent properties of wet fastness.

By printing the dyestuff in the presence of urea and sodium carbonate on cotton fabric, thermo-setting and after-treating as usual, a greenish blue print of good properties of fastness was obtained.

Example 11

48.8 parts of 1 - amino - 4 - (aminophenyl-3'-amino)-anthraquinone-2,4'-disulfonic acid were reacted with 18.6 parts of 2-chloro-3,3-difluorocyclobutenecarboxylic acid chloride-1 under the conditions described in Example 10. The dyestuff of the formula

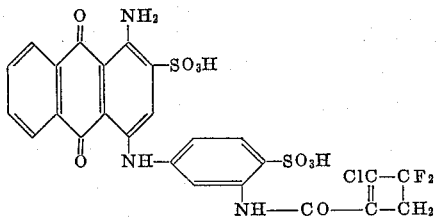

was obtained which when applied to cotton in an alkaline bath gave a blue dyeing of good properties of wet fastness.

By printing the dyestuff in the presence of sodium carbonate on linen fabric and thermo-setting the dyestuff by steaming in a continuously operating steamer, a bright blue print of good fastness to washing was obtained.

Example 12

76.3 parts of [Cu-phthalocyanine-(SO₃H)₂₋₃]-(3'-sulfo-4'-aminophenyl)-sulfonamide obtained by causing a tertiary organic base to act upon a mixture of [Cu-phthalocyanine]-(SO₂Cl)₃₋₄ and the sodium salt of 1,4-diaminobenzene-3-sulfonic acid in aqueous suspension, were reacted with 25.7 parts of 1,2,2-trichloro-3,3-difluorocyclobutanecarboxylic acid chloride-1 under the reaction conditions described in Example 1. The dyestuff of the formula

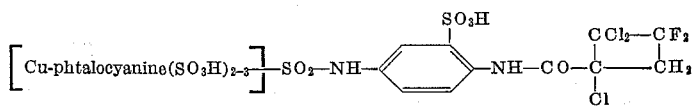

was obtained which when applied to cotton in an alkaline bath gave a greenish blue dyeing of very good properties of wet fastness.

Example 13

36.4 parts of the compound of the formula

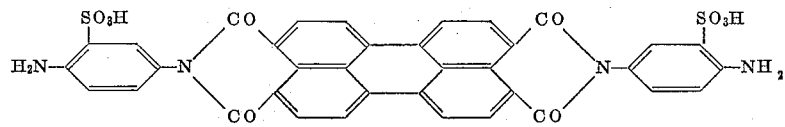

obtained by reacting 1,4-diaminobenzene-2-sulfonic acid at 180° C. with perylenetetracarboxylic acid anhydride in quinoline, were suspended in 500 parts by volume of water. A saturated aqueous solution of 110 parts of sodium dithionite (Na₂S₂O₄·2H₂O) was added and the whole was adjusted to pH 7.5 with 2 N-sodium carbonate solution under a nitrogen atmosphere. Subsequently, 22.3 parts of 2,2-dichloro-3,3-difluorocyclobutanecarboxylic acid chloride-1 and simultaneously 2 N-sodium carbonate solution were added dropwise in a manner such that a pH range of 7.5 to 8 was maintained. After acidification to obtain a pH of 2 and passing air through at elevated temperature in one instance or adding an aqueous solution of an oxidizing agent such as hydrogen peroxide and sodium perborate, respectively, in another instance, the dyestuff of the formula

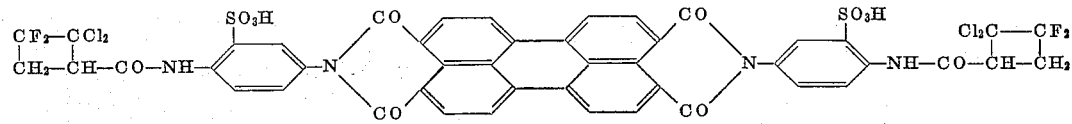

was precipitated.

1 part of this dyestuff was dissolved in a solution of 2.5 parts of sodium dithionite in 1000 parts by volume of water. 10 parts of a cotton fabric were introduced into the red-violet solution and moved therein for 30 minutes after adding 5 parts of a sodium hydroxide solution of 10% strength. By introducing air at a temperature of 80° to 100° C. in one instance or adding a dilute solution of an oxidizing agent such as sodium perborate and hydrogen peroxide, respectively, in another instance, a reddish blue dyeing of very good properties of wet fastness was obtained on cotton.

In the preparation of the dyestuff as well as in the dyeing process there could be used, instead of the above alkalies, other alkalies, for example sodium bicarbonate, soda, sodium hydroxide solution or tertiary sodium phosphate, and, instead of sodium dithionite, other reducing agents commonly used in vat dyeing.

The dyeing temperature could also be varied considerably.

*Example 14*

19 parts of 4-aminoanthraquinone-4'-trifluoromethyl-2, 1-(N)-1′2′-(N)-benzacridone were reacted with 9.3 parts of 2-chloro-3,3-difluorocyclobutenecarboxylic acid chloride-1 under the conditions described in Example 13 and subsequently precipitated. The dyestuff of the formula

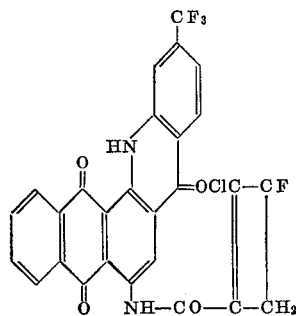

was obtained which, under the dyeing conditions described in Example 13, gave a blue dyeing on cotton that had good properties of wet fastness.

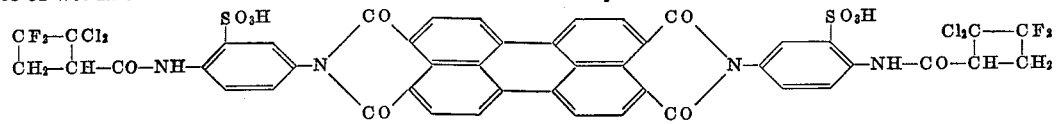

*Example 15*

43 parts of alpha-aminonaphthothioxanthonesulfonic acid of the formula

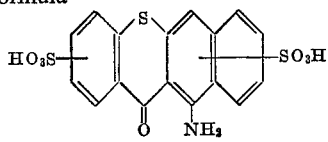

obtained from o-mercaptobenzoic acid and 1-aminonaphthalene in sulfuric acid of a density of 1.84, were adjusted to pH 7.5 with 2 N-sodium carbonate solution and acylated by adding dropwise a solution of 21.5 parts of 2-chloro-3,3-difluoro - 4,4 - dimethylcyclobutenecarboxylic acid chloride-1 dissolved in 50 parts by volume of acetone. By simultaneous addition of a further quantity of 2 N-sodium carbonate solution, the pH was maintained at 7.5 to 8. By acidification with a small amount of glacial acetic acid to obtain a pH of 4 and addition of sodium chloride, the dyestuff of the formula

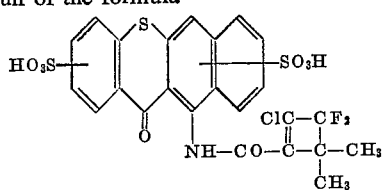

was precipitated. The dyestuff, when applied to cotton in an alkaline bath, gave a khaki-coloured dyeing of very good properties of wet fastness.

We claim:
1. A water-soluble dyestuff of the formula

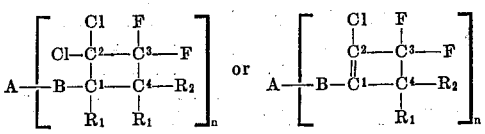

wherein A is a water-soluble anthraquinone-, phthalocyanine-, perylene tetracarboxylic acid amide, benzacridone or naphthothioxanthene dyestuff radical, B is —NHCO— or

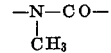

$R_1$ is hydrogen, chlorine or lower alkyl, $R_2$ is hydrogen or lower alkyl, and $n$ is 1 or 2.

2. The dyestuff of the formula

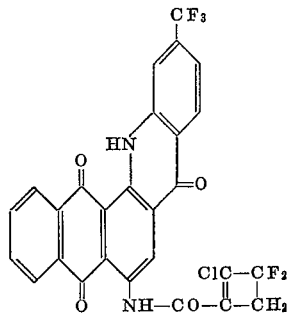

3. The dyestuff of the formula

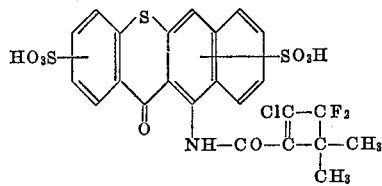

4. The dyestuff of the formula

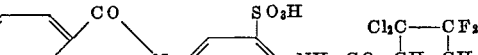

5. The dyestuff of the formula

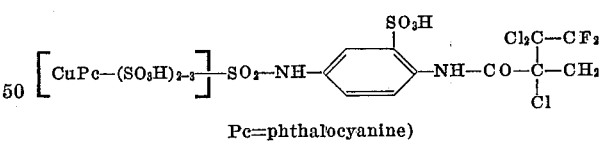

Pc=phthalocyanine)

6. The dyestuff of the formula

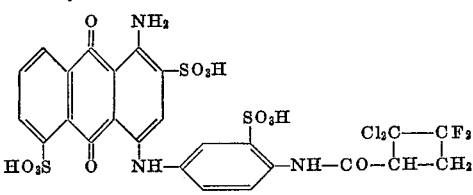

7. The dyestuff of the formula

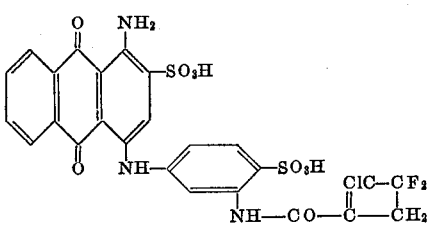

(References on following page)

References Cited

UNITED STATES PATENTS

| | | | |
|---|---|---|---|
| 2,426,313 | 8/1947 | Ludwig et al. | 260—143 |
| 2,700,686 | 1/1955 | Dickey et al. | 260—196 X |
| 2,714,587 | 8/1955 | Neier et al. | 260—162 X |
| 3,112,304 | 11/1963 | Senn | 260—162 X |
| 3,117,117 | 1/1964 | Berrie et al. | 260—162 |
| 3,117,962 | 1/1964 | Rohland et al. | 260—162 |
| 3,208,992 | 9/1965 | Bowman et al. | 260—162 |
| 3,274,173 | 9/1966 | Dehn et al. | 260—205 |
| 3,278,516 | 10/1966 | Scherer et al. | 260—163 |
| 3,278,549 | 10/1966 | Scherer et al. | 260—314.5 |

FLOYD D. HIGEL, *Primary Examiner.*